United States Patent [19]
Falk et al.

[11] 3,935,512
[45] Jan. 27, 1976

[54] CIRCUIT FOR THE COMPENSATION OF CURRENT INTERFERENCE SIGNALS

[75] Inventors: Jean-Pierre Falk; André Rohr, both of Geneva, Switzerland

[73] Assignee: Societe Anonyme des Ateliers de Secheron, Geneva, Switzerland

[22] Filed: Dec. 11, 1974

[21] Appl. No.: 531,608

[30] Foreign Application Priority Data
Dec. 20, 1973 Switzerland.................... 17866/73

[52] U.S. Cl..................... 317/27 R; 317/49; 324/51
[51] Int. Cl.²........................................... H02J 1/02
[58] Field of Search..................... 307/92–94, 307/134; 317/14 C, 27 R, 36 D, 49, 50; 321/9 R, 10, 11, 12, 14; 324/51, 102

[56] References Cited
UNITED STATES PATENTS

| | | | |
|---|---|---|---|
| 3,048,744 | 8/1962 | Warrington | 317/36 D |
| 3,519,884 | 7/1970 | Paddison et al. | 317/36 D |
| 3,543,092 | 11/1970 | Hoel | 317/27 R |

*Primary Examiner*—A. D. Pellinen
*Attorney, Agent, or Firm*—Oblon, Fisher, Spivak, McClelland & Maier

[57] ABSTRACT

A circuit which compensates for interference signals when monitoring conditions such as overcurrents and the like in a larger network. The circuit includes a current-signal branch and a compensating branch, the latter fed with an interference voltage and containing a variable gain amplifier. Both branches of the circuit are coupled to a signal superimposing element in the form of a summing amplifier, the output of which is applied to a polarity comparator. The polarity comparator, which is three-state device, forms a portion of a feedback network for controlling the gain of the variable gain amplifier.

10 Claims, 6 Drawing Figures

CIRCUIT FOR THE COMPENSATION OF CURRENT INTERFERENCE SIGNALS

BACKGROUND OF THE INVENTION

1. Field of the Invention

This invention relates generally to an interference compensating circuit and more particularly to a circuit for the compensation of current interference signals in another circuit to which a voltage containing a disturbing component is applied. Thus the present invention concerns the compensation of interference signals inherent in a current-dependent signal where these signals are caused, not by variations of a load impedance of the circuit, but by variations or fluctuations of the source voltage feeding the circuit or of the internal resistance of the source.

2. Description of the Prior Art

In practical applications, the point of demarcation between the external impedance of a circuit and the internal resistance or impedance of the source is in fact dependent on the measuring or monitoring task in question. In the case of monitoring a certain section of a network or line for overcurrents due to short circuits, for example, the impedance — or if appropriate, a corresponding equivalent impedance — of the section concerned is to be viewed as the external impedance. Fluctuations (or collapse in the event of a short circuit) of this external impedance govern the current signals to be detected or selected, whereas the equivalent impedance of the remainder of the network, insofar as it influences the current in the monitored section, is to be viewed as the internal impedance of the source feeding the section. Variations of this impedance, but more importantly of the source voltage — in particular periodic voltage variations of a disturbing nature, such as harmonics from frequency changes, inverters or rectifiers — give rise to current interference signals in the monitored section of network or line which require compensation.

In practice, such interference signals seriously impair the monitoring of overcurrents and short circuits. This is particularly so in the case of railway contact wires with high maximum operating currents which in themselves are still acceptable, but which under certain circumstances can be of the same order to magnitude as short-circuit currents. In such cases, also, the current fluctuations attributable to the source voltage can be of the same order as the short-circuit currents. In such cases, also, the current fluctuations attributable to the source voltage can be of the same order as the short-circuit currents, so that detection of short circuits without compensation of current variations due to the source voltage is not possible. However, the detection of short circuits must be independent of whether maximum permissible currents are exceeded, owing to the risk of damage, and especially fire, to the installations concerned.

SUMMARY OF THE INVENTION

Accordingly, one object of the invention, therefore, is to create a compensation circuit which allows the current signals caused by variations of an external impedance or load impedance to be distinguished from current interference signals due to the source, and in particular to the source voltage.

Briefly, this and other objects of the invention are achieved by means of a circuit of the kind stated above, such that a current-signal branch and a compensation branch, the latter fed with an interference voltage and containing a controllable signal control element, are connected with opposite polarity to a superimposing element, the output of which carries a resultant superimposed signal and together with a connection of the compensation branch or of the current-signal branch is connected to a polarity comparator, the output of which is actively connected to a control input of the signal control element.

The interference voltage referred to here is, for example, a voltage fluctuation of the kind mentioned above, caused by the source. In the case of a d.c. network supplied through a rectifier, it is perhaps the a.c. voltage component (and its harmonics) contained in the terminal voltage of the monitored network section and dependent on the number of pulses of the rectifier. A signal corresponding to this interference voltage is used to compensate the disturbing component of the current signal brought about by this same interference voltage, this being achieved by means of a control loop acting through the polarity comparator mentioned. The polarity comparator, as its name indicates, determines the polarity relationship — equal or opposite — of the signal corresponding to the interference voltage, on the one hand, and of the more or less undercompensated or overcompensated resultant signal, on the other, the latter being obtained by superimposition of the signals of the compensation branch and the current signal branch, and constituting the useful output signal of the compensation circuit. Depending on the relative polarities, the output of the polarity comparator controls the signal control element, and hence the compensation signal effective in the case of superimposition, always acting in the opposite direction of the variation in the instantaneous condition in the sense of under or overcompensating the current interference signal within the resultant superimposed signal. The useful superimposed signal thus oscillates about the exactly compensated state within in practice very narrow limits determined by the behaviour of the control loop.

With a predominantly resistive load impedance the interference voltage, or its corresponding compensation signal, is suitable directly for compensating interference in a current signal essentially proportional to the monitored current, and with a predominantly inductive-reactive load impedance, accordingly, for compensating interference in a differential signal, as is known to be used to advantage for detecting short circuits in electrical networks, particularly on d.c. railway contact wires.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
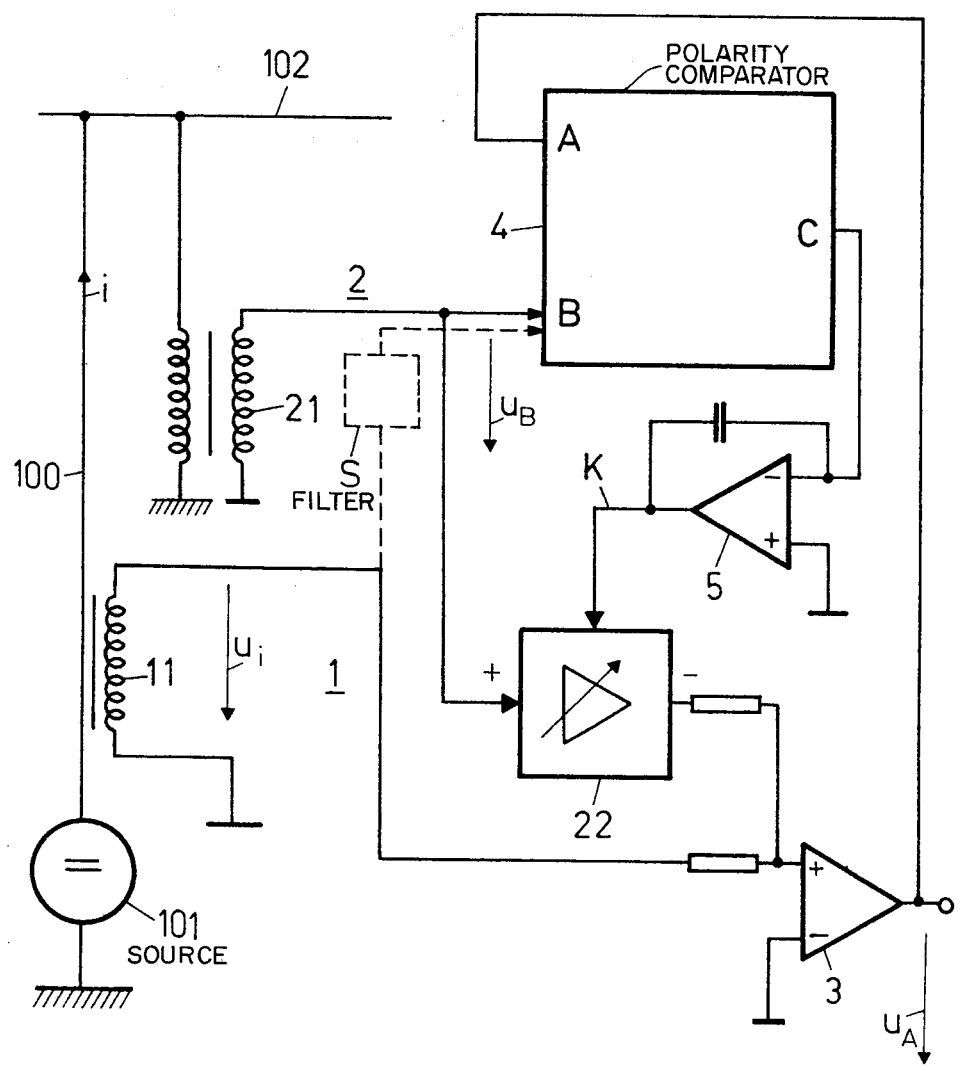
FIG. 1 is a circuit diagram of the compensation circuit according to the invention.

Referring now to the drawings, wherein like reference numerals designate identical or corresponding parts throughout the several views, and more particularly to FIG. 1 thereof, a differential current-signal sensing device 11 is illustrated in the form of a current transformer. The current signal sensing device 11 acts as a high-pass filter and is connected to a circuit to be monitored 100, incorporating a power supply source 101 subject to interference voltages, and a load in the form of a busbar 102 with predominantly inductive consumers (not shown). The circuit further comprises a d.c. voltage-inhibiting transfer element in the form of a voltage transformer 21 connected to a voltage-measuring path of the circuit 100. The function of this transformer is to convert the a.c. voltages superimposed on the d.c. source voltage, which in the present case are to be viewed as interference voltages, into a corresponding interference voltage signal $u_B$.

Current transformer 11, which supplies a derivative current signal $u_i$ with respect to the monitored current $i$, is connected to a current signal branch 1 which, together with a compensation branch 2 connected to voltage transformer 21, leads to a superimposing element in the form of a summing amplifier 3. The compensation circuit 2 contains a signal control element consisting of an amplifier 22 the gain of which can be controlled continuously by way of input K. This amplifier has an inverting action — as indicated by the opposite signs at its input and output — and thus causes the compensation signal (not described further) appearing at its output to be subtracted from the current signal $u_i$. Owing to the assumed inductive loads, the signal proportional to the interference voltage is to a close approximation equivalent to the derivative with respect to time of the interference signal caused by this interference voltage within the current $i$. It is thus approximately proportional to the derivative current $u_i$ and can, when of a suitable value, compensate the current interference signal by means of the superimposition procedure described. The residual interference component in the resultant superimposed signal appearing at the output of summing amplifier 3 is of reversed polarity relative to the interference component of the current signal if the compensation signal is too large (i.e. overcompensation) and of the same polarity when the compensation signal is too small (i.e. undercompensation). The converse applies to the polarity of the resultant superimposed signal relative to that of the compensation signal, and hence of the inverted interference voltage signal $u_b$, if the latter is supplied by the voltage transformer 21 with the same polarity or phase position relative to the current signal $u_i$. The polarity relationships can, of course, be reversed if necessary by changing over the terminals.

In any event, an essential feature is that by comparing the polarity of the resultant superimposed signal $u_A$ at the output of the summing amplifier 3 with the polarity of the interference signal in the form of the interference-voltage or compensation signal, or alternatively the interference component of the current signal, it is possible to distinguish between under and overcompensation of the current interference signal within the resultant superimposed signal, i.e. the useful signal. Thus, both the interference voltage signal and the interference component of the current signal can be used for polarity comparison purposes. In the latter case it is generally necessary to separate the interference component from the useful component by frequency filtering or a similar method, although this is not critical with spectrally widely different interference and useful signals, and in contrast to direct frequency separation can be achieved without serious inertia phenomena in the resultant useful signal, as for example in the case of a periodic interference signal and a unique useful signal (short circuit). The interference voltage, on the other hand, is itself easily available, often without filtering, in the terminal voltage of the monitored circuit section. It is therefore generally more advantageous to use the interference voltage for compensation and polarity comparison purposes.

In the illustrated embodiment, a polarity comparator 4 is provided, the input B of which is connected to the compensation branch, and input A to the output of the summing amplifier 3. Alternatively, as shown by the broken line, input B can also be connected to the current signal branch via a filter element S which essentially blocks the useful signal. If required, input B and the compensation branch can also be fed via the filter from the current signal branch, instead of from the voltage transformer.

The output C of the polarity comparator 4 is connected by way of an integrator 5 to the control input K of amplifier 22. The polarity comparator functions in the manner of a discontinuous controller, for example as a two-term controller or a three-term controller with a neutral band, and owing to the interposed integrating element (which if required can be contained in the polarity comparator or the signal control element and can comprise easily available inertia devices) provides continuous control of the signal control element. The result is thus a closed control loop which at all times maintains a state of balance within narrow limits between overcompensation and undercompensation.

Figure 2:
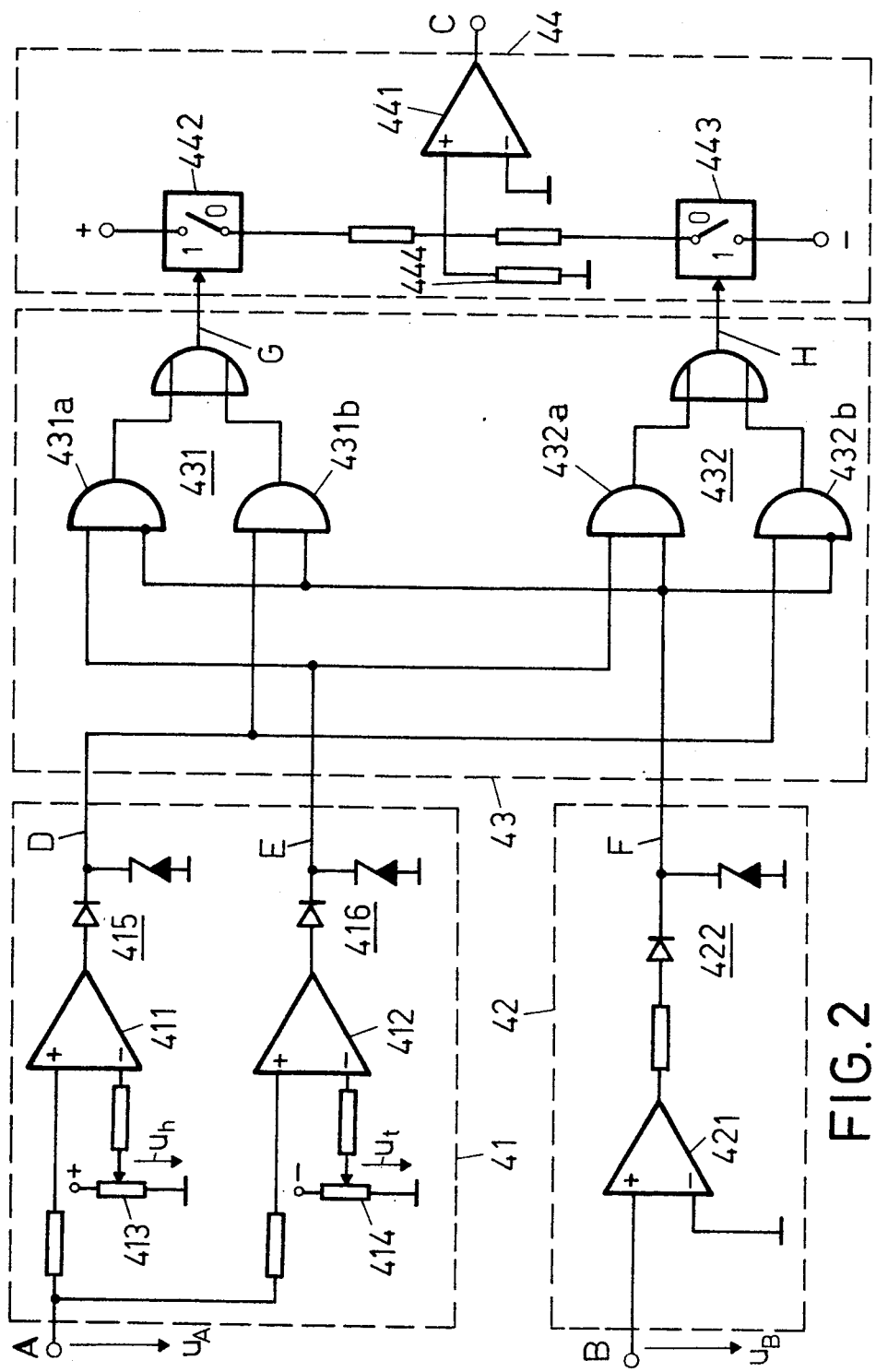
FIG. 2 is a detailed circuit diagram of the polarity comparator of the compensation circuit depicted in FIG. 1; and, FIGS. 3a through 3d comprise a multiple time diagram illustrating the operating principle of the compensation circuit.

As shown in FIG. 2, input A of the polarity comparator is allocated to a limit-value switch 41, and input B to a rectangular-wave signal generator 42 with a high-grade amplifier 421 followed by a rectifier and limiter stage 422. Thus, all the time the value of the interference voltage signal $u_B$ is positive, the output yields a positive rectangular pulse which is fed as a binary affirmative signal (1 = affirmative, 0 = negative) to a subsequent logic circuit 43.

The polarity comparator further comprises within the limit-value switch 41 an upper and a lower limit-value emitter 413 and 414 with the upper and lower limit voltage $u_h$ and $u_l$, respectively, such that if these are exceeded, amplifiers 411 and 412, which have their normal inputs parallel to input A, are driven and via rectifier and limiter stages 415 and 416 supply a positive rectangular signal in the form of a binary affirmative signal at both outputs D and E. If the superimposed signal $U_A$ lies between $u_h$ and $u_l$, both outputs D and E carry a binary negating signal corresponding to an output voltage of zero. This is equivalent to the neutral band of a three-term controller. The logic circuit 43 comprises an undercompensation detector 431 with AND gates 431a, 431b and an OR gate leading to an output G, and an overcompensation detector 432 with AND gates 432a and 432b and also an OR gate leading to output H. With the depicted arrangement of the AND gates connected to the output D, E and F of circuit sections 41 and 42, the operating principle of the logic circuit is as follows. When $u_A$ is in the neutral band, both outputs G and H carry a binary negating signal, otherwise, in the event of undercompensation G carries an affirmative signal and H a negating signal, while with overcompensation G carries a negating signal and H an affirmative signal.

These binary signals at G and H control associated normally-open switches 442 and 443, respectively, of a succeeding superimposing stage 44, the output C of which, formed by a summing amplifier 441, owing to a zero input 444 to this amplifier at zero potential in the neutral band, assumes a preset positive potential in the case of undercompensation because of the positive voltage applied to switch 442, and a preset negative potential in the event of overcompensation because of the negative voltage applied to switch 443. These potentials are integrated over time in the integrator shown in FIG. 1, and control the signal control element 22 in the sense of a closed compensating control loop.

If the limit-value emitters 413 and 414, comprising potentiometers with associated voltage sources, are adjusted to zero potential, the neutral band disappears and the polarity comparator assumes the character of a two-term controller. If the interference signal is highly asymmetrical in time, however, three-term control has the advantage of better compensation of the fundamental oscillation, and can also offer advantages regarding stability of the control loop.

Figure 3:
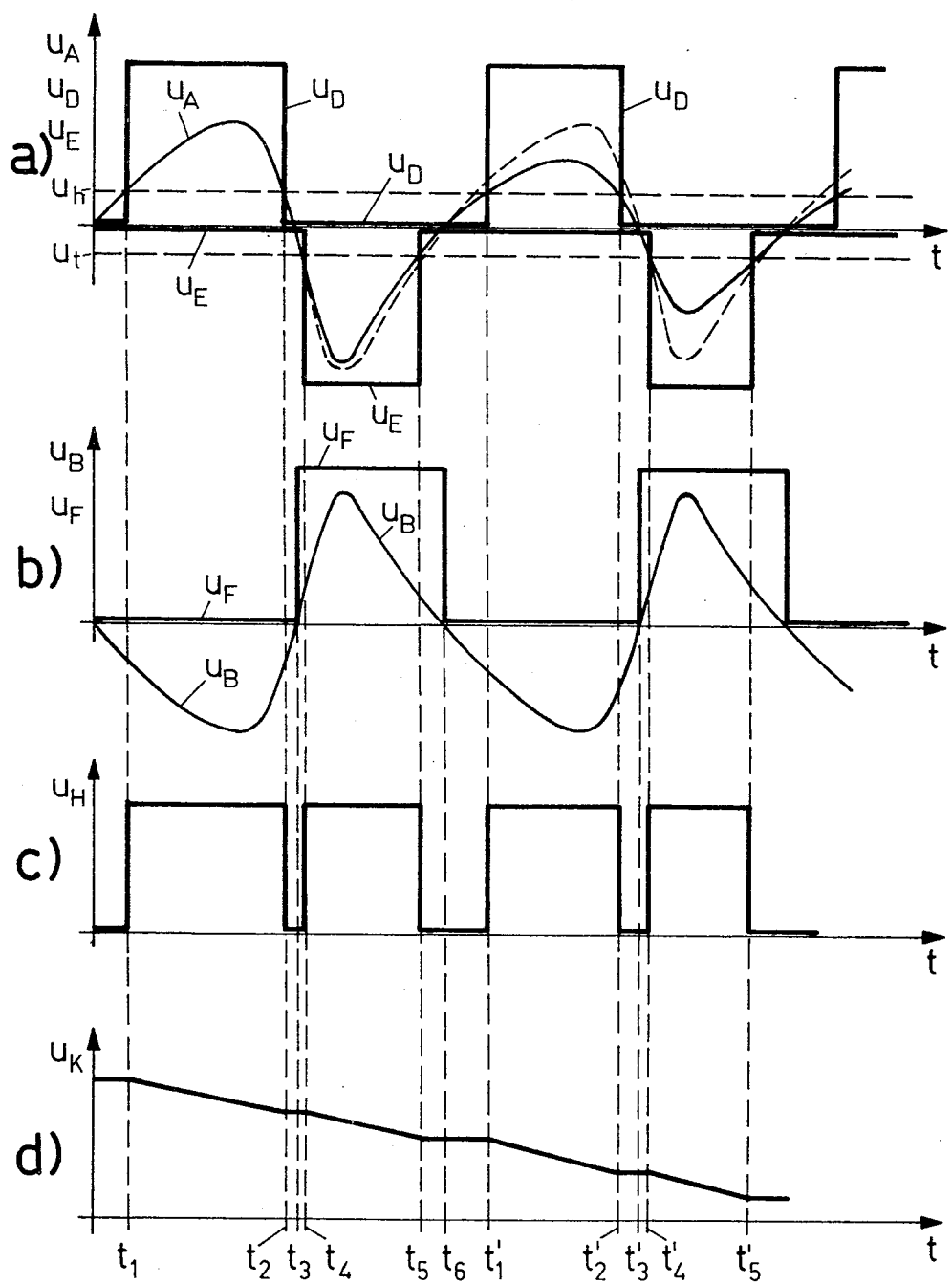

FIG. 3 shows curves of signal voltage at the already described points A, D and E in line $a$, B and F in line $b$ and at points H and K in lines $c$ and $d$, respectively. These points of the circuit correspond to the indices of the voltages plotted against time $t$. Voltage $u_E$ in line $a$ is shown extending downwards from the time axis, in contrast to voltage $u_D$, for reasons of clarity only. As mentioned in the description of the polarity comparator with reference to FIG. 2, both $u_E$ and $u_D$ are positive potentials in the form of binary affirmative signals.

The example shown corresponds to the case of overcompensation with $u_A$ and $u_B$ of opposite polarity or phase position. An affirmative binary signal $u_H$ is therefore produced between times $t_1$-$t_2$ and $t_4 - t_5$. In accordance with the three-term control explained above, this binary signal is negated within time intervals $t_e$-$t_4$ and $t_5$-$t_6$ owing to the simultaneously negating binary signals $u_D$ and $u_E$, even though $u_A$ and $u_B$ are of opposite polarity. The cycle repeats from time $t'_1$ onwards, but with reduced pulse duration between $t_1$, and $t_2$, and between $t_4$, and $t_5$, because the degree of overcompensation has already been reduced by the control system.

The correspondingly decreasing control signal $u_K$ at the output of the integrator 5, starting from a positive value of overcompensation, is shown in line $d$. This is obtained from $u_H$ by integration over time.

Correction of initial undercompensation, which does not need to be shown separately, produces conversely a rising curve of $u_K$, in which case $u_G$ is effective instead of $u_H$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A circuit for the compensation of current interference signals in another circuit to which a voltage containing a disturbing component is applied comprising:
   a current-signal branch and a compensation branch,
   means for applying an interference signal to said compensation branch,
   a controllable signal control element coupled to said compensation branch and including a control input,
   superimposing means coupled to both said current-signal branch and said compensation branch for providing a superimposed output signal,
   a polarity comparator coupled to the output of said superimposing means, the output of said polarity comparator coupled to said control input for regulating the output of said controllable signal control element.

2. A circuit as in claim 1, further comprising:
   high-pass filter means for coupling said current-signal branch to said circuit to which said disturbing voltage component is applied.

3. A circuit as in claim 2, wherein:
   said high-pass filter means acts as a differentiating device.

4. A circuit as in claim 1, further comprising:
   transfer means coupling said compensation branch and said circuit to which said disturbing voltage component is applied for inhibiting the transmission of d.c. voltage to said compensation branch.

5. A circuit as in claim 1, wherein said polarity comparator comprises:
   a discontinuous switching network having at least two opposite switching states corresponding to the different polarity relationships of input signals thereto.

6. A circuit as in claim 5, wherein said polarity comparator further comprises:
   a three-state controller having a neutral band with respect to at least one of its input signals.

7. A circuit as in claim 6, wherein:
   said polarity comparator is constructed so that said neutral band is assigned to a preset range of values of the output from said superimposing means.

8. A circuit as in claim 5, further comprising:
   means coupled to said polarity comparator for integrating the output thereof with respect to time.

9. A circuit as in claim 8, wherein:
   said integrating means is coupled between said polarity comparator and said control element.

10. A circuit as in claim 9, wherein:
    said superimposing means comprises a summing amplifier.

* * * * *